United States Patent
Wong et al.

(10) Patent No.: US 7,039,776 B2
(45) Date of Patent: May 2, 2006

(54) PATCH MEMORY SYSTEM FOR A ROM-BASED PROCESSOR

(75) Inventors: Yuqian C. Wong, San Diego, CA (US); Langford M. Wasada, San Diego, CA (US); Daniel C. Bozich, San Diego, CA (US); Mitchell A. Buznitsky, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 288 days.

(21) Appl. No.: 10/417,933

(22) Filed: Apr. 17, 2003

(65) Prior Publication Data

US 2004/0210720 A1 Oct. 21, 2004

(51) Int. Cl.
*G06F 12/02* (2006.01)

(52) U.S. Cl. ............ 711/159; 712/226; 712/233; 712/234

(58) Field of Classification Search .......... 712/226, 712/233; 711/132, 102, 103, 159, 170
See application file for complete search history.

(56) References Cited

U.S. PATENT DOCUMENTS

| | | | | |
|---|---|---|---|---|
| 5,790,860 A | * | 8/1998 | Wetmore et al. | 717/122 |
| 5,802,549 A | * | 9/1998 | Goyal et al. | 711/102 |
| 6,260,157 B1 | * | 7/2001 | Schurecht et al. | 714/8 |

* cited by examiner

*Primary Examiner*—T. Nguyen
(74) *Attorney, Agent, or Firm*—Garlick Harrison & Markison; Robert McLauchlan

(57) ABSTRACT

An embedded ROM-based processor system including a processor, system memory, a programmable memory, a data selector and a patch controller. The system memory includes a read-only memory (ROM). The programmable memory stores patch information including patch code and one or more patch vectors. Each patch vector includes a break-out address from the ROM and a patch-in address to a corresponding location within the patch code. The data selector has an input coupled to the system memory and an output coupled to the processor. The patch controller is operative to compare an address provided by the processor with each break-out address to determine a breakout condition, and to control the selector to transfer the processor to a corresponding location within the patch code in response to a break-out condition. The programmable memory may be volatile memory, where the patch information is loaded from an external memory during initialization.

22 Claims, 10 Drawing Sheets

PATCH MEMORY SYSTEM FOR A ROM-BASED PROCESSOR

BACKGROUND

1. Technical Field

The present invention relates generally to processor systems, and more particularly to a patch system for a ROM-based processor to enable bug fixes and functional enhancements.

2. Description of Related Art

Electronic devices, including battery-powered devices and the like, are often implemented using system-on-chip (SOC) designs including a processor chip or integrated circuit (IC) with an embedded processor. Examples of such applications include, but are not limited to, mobile handsets, smart phones, personal digital assistants (PDAs), automotive Telematic systems, point of sale (POS) input devices, remote controls, remote sensors, laptop personal computers, and computer peripheral devices. Exemplary computer peripheral devices include, but are not limited to, PCMCIA cards, CF cards, USB dongles, wireless keyboards, wireless pointing devices, wireless mice, wireless trackballs, game controllers and joysticks. An embedded processor comprises a processor chip or IC incorporating an on-chip processor, which further includes a read-only memory (ROM) and a random access memory (RAM) communicatively coupled together via a processor bus. An internal bus adapter unit or the like may also be provided to provide an interface between the processor bus and an "external" bus on the IC, such as an SOC bus or the like.

In order to reduce power consumption and die area of the processor system or subsystem, it is advantageous to store the processor code in the internal ROM instead of the RAM. In other words, the processor code and/or instructions are already stored on the ROM, and the RAM is used as workspace and to temporarily store data. A significant drawback of such ROM-based processor systems was that, once fabricated, the ROM contents, and therefore, the processor function, could not be changed. The ROM contents were fixed and the ROM itself was embedded and could not be directly accessed or replaced. Such fixed design disabled the ability to provide bug fixes and functional enhancements that would otherwise be considered desirable or necessary from time to time to increase the value and/or lifespan of the electronic device.

Thus, there is a need in the art for a patch system to enable upgrades to ROM-based embedded processor systems and the like.

SUMMARY OF THE INVENTION

An embedded ROM-based processor system according to an embodiment of the present invention includes a processor, system memory, a programmable memory, a data selector and a patch controller. The system memory includes a read-only memory (ROM). The programmable memory stores patch information including patch code and one or more patch vectors. Each patch vector includes a break-out address from the ROM and a patch-in address to a corresponding location within the patch code. The data selector has an input coupled to the system memory and an output coupled to the processor. The patch controller is operative to compare an address provided by the processor with each break-out address to determine a breakout condition, and to control the selector to transfer the processor to a corresponding location within the patch code in response to a break-out condition.

The programmable memory may be any combination of memory types, including non-volatile and/or volatile memory. In one embodiment, the programmable memory includes registers implementing a patch table for storing the patch vectors and the patch code is stored in the RAM portion of system memory. The patch code may be mapped into an unused portion of the ROM space of system memory. An external interface may be provided to couple an external programmable non-volatile memory that stores the patch information. The ROM portion may include one or more patch load instructions or the like to determine the presence of an external memory storing patch information and to download the patch information into the programmable memory. Alternatively, external host logic or the like controls loading of the patch information during initialization of the processor.

The patch controller may facilitate transferring control to the patch code, such as providing a jump instruction and the corresponding patch-in address to the processor. The patch controller may also facilitate saving the state of system memory, such as by pushing the contents of a memory state register onto a stack memory. In this case, the patch code may include instructions to facilitate restoring the memory state to return control back to the ROM.

Moreover, other aspects of the present invention will become apparent with further reference to the drawings and specification, which follow.

DETAILED DESCRIPTION OF THE DRAWINGS

Figure 1:
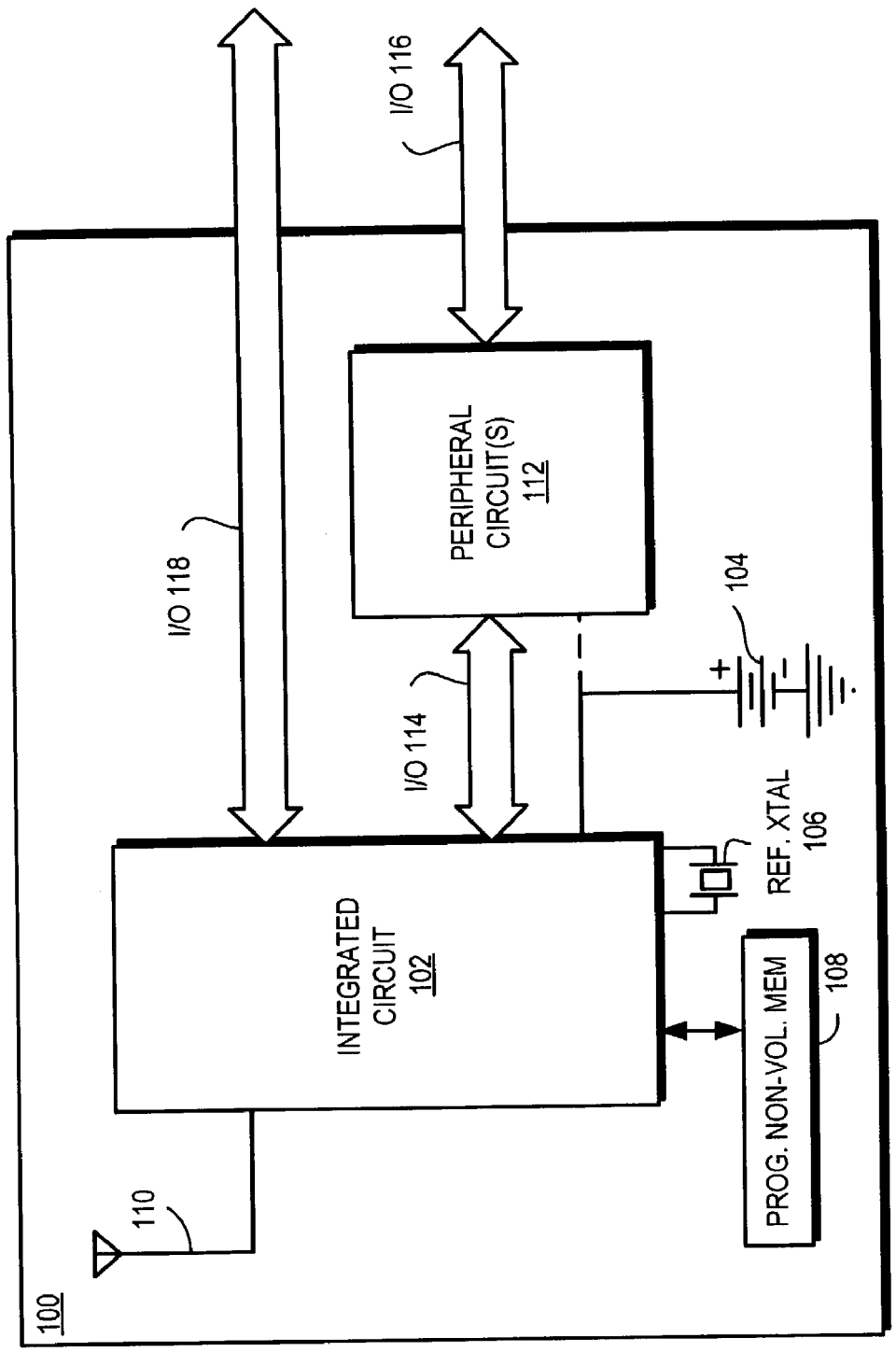
FIG. 1 is a simplified block diagram of an exemplary electronic device implemented according to an embodiment of the present invention.

FIG. 1 is a simplified block diagram of an exemplary electronic device 100 implemented according to an embodiment of the present invention. The configuration illustrated is generalized in that it represents any one of several different types of devices, such as, for example, a mobile handset, a smart phone, a PDA, an automotive Telematic system, a POS input device, a remote control or remote sensor, a laptop PC, or any one of several different types of computer peripheral devices. Exemplary computer peripheral devices include, but are not limited to, PCMCIA cards, CF cards, USB dongles, wireless keyboards, wireless pointing devices, wireless mice, wireless trackballs, game controllers and joysticks. The exemplary electronic device 100 is a wireless device, although it is understood that the present invention is applicable to any type of embedded processor system and not limited to wireless configurations.

The electronic device 100 includes an integrated circuit (IC) 102 incorporating an embedded processor implemented according to an embodiment of the present invention. The IC 102 couples to a power source 104, a reference crystal (Ref. Xtal) 106 that produces a desired reference frequency (e.g. 12 MHz), a programmable non-volatile memory 108, and an antenna 110. The memory 108 is provided for storing configuration data, and may be implemented by any type of programmable non-volatile memory device, such as, for example, an Electrically Erasable Programmable Read Only Memory (EEPROM), a Flash memory, etc., or any combination thereof. As described further below, the memory 108 is dedicated to the IC 102 and may be utilized to store patch information that incorporates bug fixes and/or functional enhancements that may be desirable or necessary from time to time to increase the value and/or lifespan of the electronic device 100 including the IC 102. As described further below, the patch information includes patch code and one or more patch vectors, each patch vector including a break-out address and a corresponding patch-in address.

Any suitable power source 104 is contemplated, such as chargeable or non-rechargeable batteries (e.g., a pair of either AA batteries or AAA batteries) or any suitable regulated or unregulated power supply. The antenna 110, if provided, may be an internal or external antenna depending upon the type and size of electronic device 100. For example, an internal antenna is contemplated for PC Cards, wireless mice, wireless keyboards, etc. The electronic device 100 further includes a peripheral circuit 112 coupled to the IC 102 via an appropriate Input/Output (I/O) interface 114. Depending upon the type of device, the peripheral circuit 112 may be coupled to the power source 104 as indicated by a dashed line. Additional interfaces are contemplated, such as an I/O interface 116 enabling external access to the peripheral circuit 112 and/or an I/O interface 118 enabling external access directly to the IC 102.

The implementation of the peripheral circuit 112 and the existence and configuration of the I/O interfaces 114, 116 and 118 depend upon the type of electronic device 100. For a wireless mouse, for example, the peripheral circuit 112 and I/O interface 114 include components and signals to implement x-axis and y-axis inputs known as "quadrature" inputs, a scroll input, and button inputs. The peripheral circuit 112 represents optical and/or mechanical devices commonly found on a computer mice to detect physical manipulations and to generate the appropriate input signals. For a wireless keyboard, for example, the peripheral circuit 112 may incorporate a key scan matrix (not shown) that provides inputs from the keyboard (not shown) and corresponding indicators (not shown) that are lit on the keyboard, such as indicating numbers, capitals, scroll lights, etc. Similar configurations are known for other pointing devices, such as trackballs or the like, and other peripheral devices, such as game controllers, joysticks, POS input devices, remote controls and sensors, etc. Also, combinations are contemplated, such as the case in which the IC 102 services both mouse and keyboard input and may reside internal to either the mouse of the keyboard with multiplexing or signal sharing functions.

Figure 2:
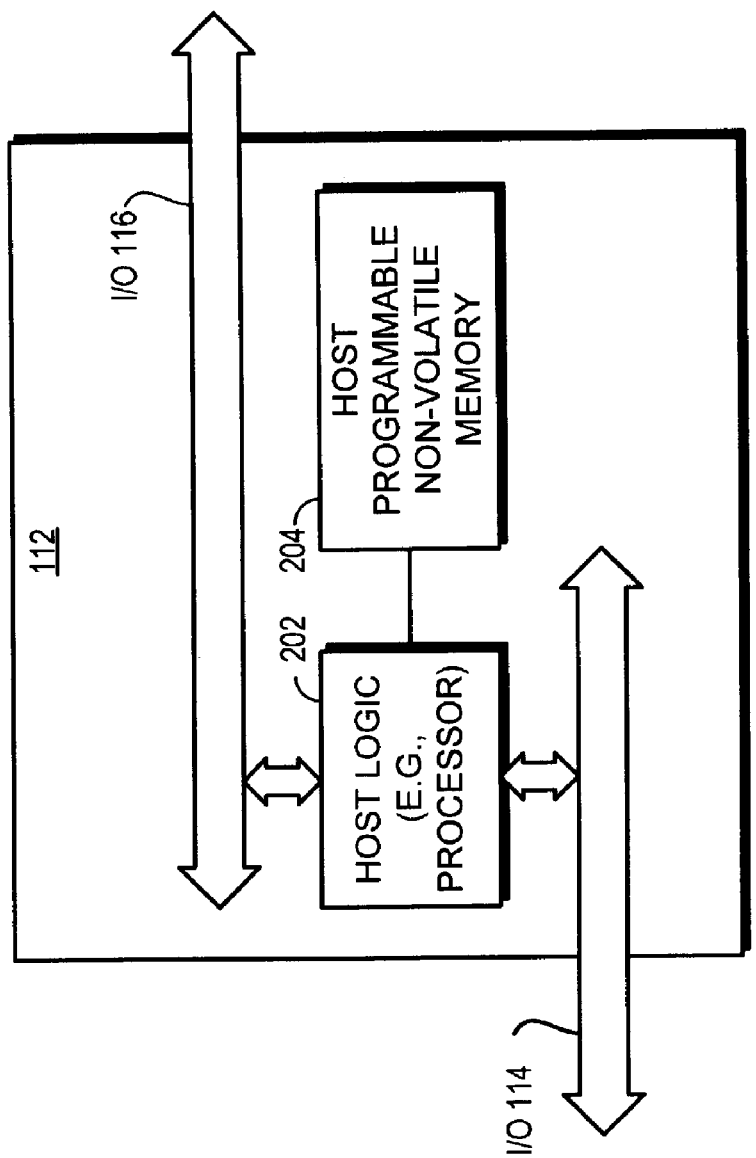
FIG. 2 is a simplified block diagram of an exemplary embodiment of the peripheral circuit of the electronic device of FIG. 1 for the more complex configurations.

The peripheral circuit 112 may represent more complex circuitry including host devices or the like, such as representing the components and circuitry of mobile handsets, smart phones, PDAs, and even laptop personal computers (PCs). FIG. 2 is a simplified block diagram of an exemplary embodiment of the peripheral circuit 112 of the electronic device 100 for the more complex configurations. In these cases, the peripheral circuit 112 includes host logic 202 coupled to either or both of the I/O buses 114, 116. In the embodiment shown, the peripheral circuit 112 further includes an optional host programmable non-volatile memory 204 coupled to the host logic 202. The host logic 202 represents any controlling logic of the electronic device 100, such as a host microprocessor or the like and any supporting circuitry for controlling primary functions. For a laptop PC, for example, the host logic 202 includes the primary microprocessor of the PC and any other circuitry of the host system, whereas the IC 102 represents an integrated or peripheral function. The memory 204 is typically provided to store configuration data for the host logic 202 and is implemented in a similar manner as the memory 108, such as comprising a Flash memory and/or EEPROM and/or the like. For embodiments including the memory 204 but not including the memory 108, the memory 204 may be used instead to store patch information for the IC 102.

The patch information, including patch code and patch vectors, is stored in either one of the memories 108 or 204 depending upon the particular configuration. For embodiments including the memory 108, patch information is downloaded and stored within the memory 108. The IC 102 is programmed to search for and detect the presence of the memory 108 and for patch information loaded therein, and to retrieve and download the patch information as described further below. For embodiments including only the memory 204, the IC 102 is either programmed to search for the memory 204 and for patch information therein, or the host logic 202 is programmed to control the patch information download process. Many different methods are contemplated for downloading the patch information to the selected memory 108 or 204. The patch information may be transferred wirelessly, such as via a cellular infrastructure or a wireless local area network (WLAN) link or a wireless communication link according to the Bluetooth standard, etc., or via a wired link to a host device or infrastructure.

Figure 3:
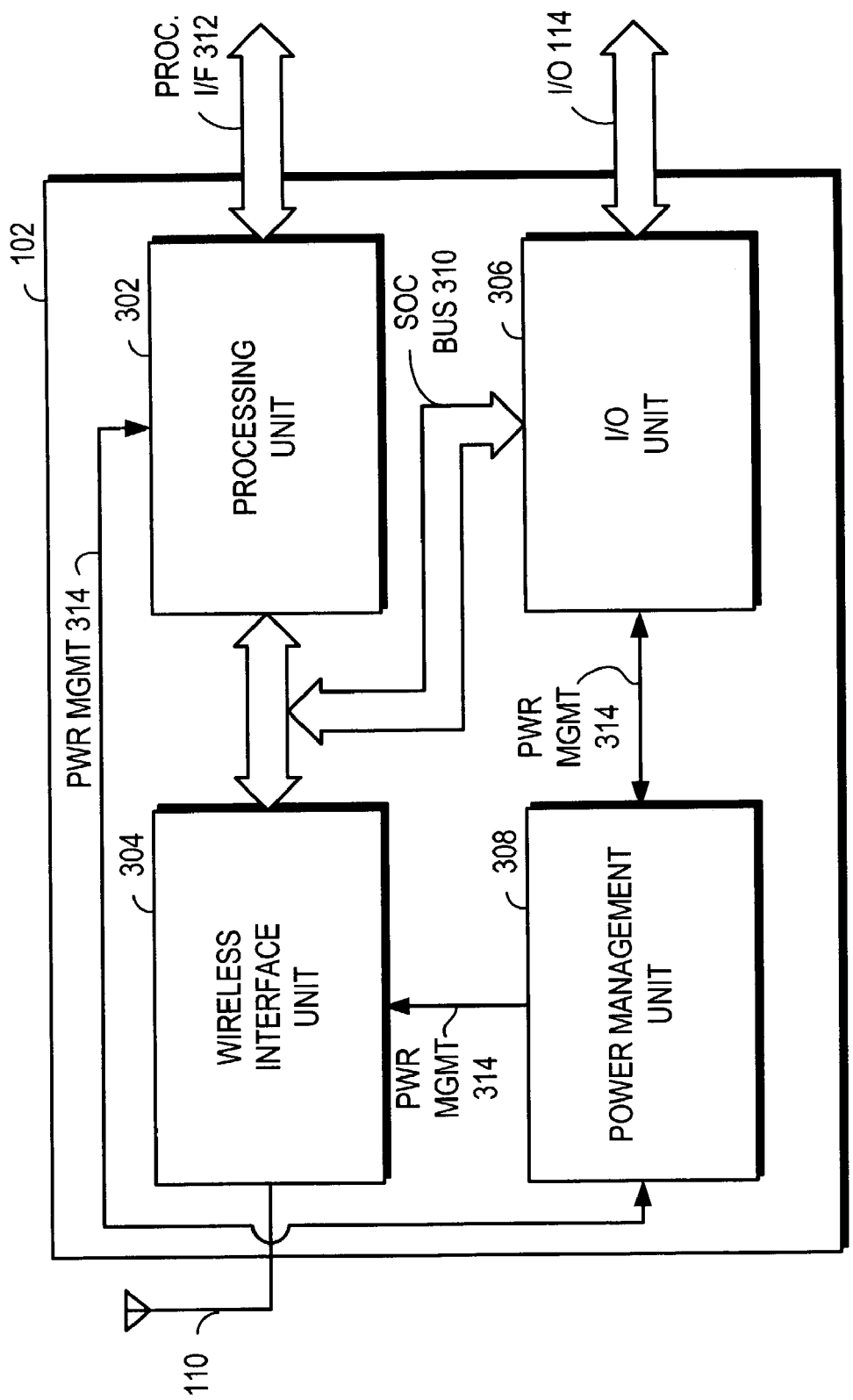
FIG. 3 is a more detailed block diagram of an exemplary embodiment of the IC of FIG. 1.

FIG. 3 is a more detailed block diagram of an exemplary embodiment of the IC 102. In this configuration, the IC 102 includes a processing unit 302, a wireless interface unit 304, an I/O unit 306, and a power management unit 308. The wireless interface unit 304 couples the IC 102 to the antenna 110. The wireless interface unit 304 operates according to any desired wireless protocol, such as the Bluetooth specification. In a more specific embodiment, the wireless interface unit 304 operates according to the Human Interface Device (HID) portion of the Bluetooth specification. The processing unit 302, the wireless interface unit 304, and the I/O unit 306 are coupled together via a system on a chip (SOC) bus 310. The processing unit 302 includes a processing interface 312 that may be used to couple the processing unit 302 to one or more peripheral devices (not shown). The I/O unit 306 interfaces the peripheral circuit 112 via the I/O interface 114. The power management unit 308 is coupled to the processing unit 302, the wireless interface unit 304, and the I/O unit 306 via a power management interface 314.

In one embodiment, the wireless interface unit 304 is implemented according to the Bluetooth specification and includes a transmit/receive switch (not shown), a 2.4 GHz transceiver (not shown), a Bluetooth core (not shown), and a frequency synthesizer (not shown). Each of these components is generally known in the field and is not described in detail. The particular configuration of the I/O unit 306 depends on the type of electronic device 100. For example, the electronic device 100 may be implemented to support wireless input devices for computers, so that the I/O unit 306 includes specific circuitry associated with the type of peripheral device. For example, for a combined keyboard mouse configuration, the I/O unit 306 may include a keyboard scanning block (not shown), a mouse quadrature decoder block (not shown), a GPIO control block (not shown), etc. Alternatively, the I/O unit 306 may be implemented as a peripheral transport unit (PTU) or the like, which is useful for voice and/or data applications, such as mobile handsets, smart phones, PDAs, PCs, automotive Telematic systems, and certain computer peripheral devices, such as PCMCIA cards, CF cards USB dongles, etc. In this case, the I/O unit 306 may include a Universal Asynchronous Receiver-Transmitter (UART) unit (not shown), a Universal Serial Bus (USB) unit (not shown), a Pulse Code Modulation (PCM) unit (not shown), etc. It is appreciated that these particular configurations are intended as non-limiting examples for purposes of illustration and not intended to limit the scope of the present invention. The power management unit 308, the wireless interface unit 304, and the I/O unit 306 are not further described as beyond the scope of the present disclosure.

Figure 4:
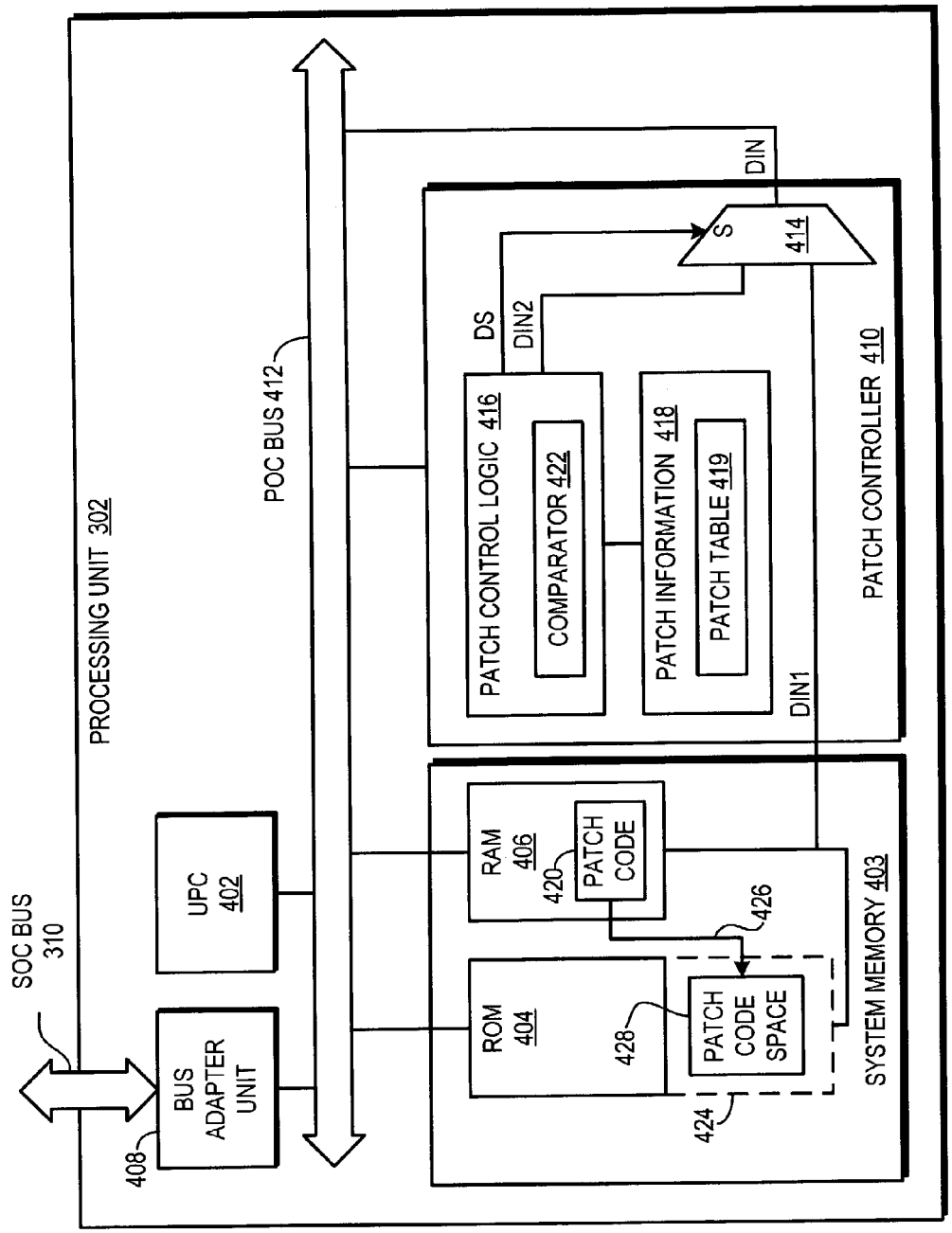
FIG. 4 is a simplified block diagram of an exemplary embodiment of the processing unit of FIG. 3.

FIG. 4 is a simplified block diagram of an exemplary embodiment of the processing unit 302 of the IC 102. The processing unit 302 includes a microprocessor core (UPC) 402, a system memory 403 including a non-volatile memory array shown as read-only memory (ROM) 404 and a dynamic or volatile memory array shown as RAM 406, a bus adapter unit 408, and a patch controller 410. It is appreciated that although the UPC 402 is referred to as a microprocessor core, any type of processing device or processor is contemplated. The UPC 402, the ROM 404, the RAM 406, the bus adapter unit 408, and the patch controller 410 are coupled together via a processor on chip (POC) bus 412. The bus adapter unit 408 interfaces the POC bus 412 with the SOC bus 310. The POC bus 412 includes address, control and data signals as known to those skilled in the art. In normal configurations, input and output memory data signals of the ROM 404 and RAM 406 are coupled to the POC bus 412 to enable access by the UPC 402. In the embodiment shown, however, memory data "input" signals of the ROM 404 and RAM 406 (input relative to the UPC 402 and output from memory), shown as signals DIN1, are instead provided to an input of a multiplexer (MUX) 414 of the patch controller 410. The MUX 414 operates as a data selector and includes another data input for receiving data input signals from patch control logic 416 of the patch system 410, shown as signals DIN2, and the output of the MUX 414 provides selected data input signals, shown as signals DIN, to the POC bus 412. Data select signals DS are generated by the patch control logic 416 and provided to the select input of the MUX 414 for controlling data and instructions provided to the POC bus 412. In this manner, the patch controller 410 is able to over-ride the normal operating procedure of the UPC 402 and selectively provide instructions.

The patch controller 410 includes the patch control logic 416 and a programmable memory 418 storing patch information. In one embodiment, all of the patch information, including patch code and a corresponding patch table 419, is stored in the memory 418. Alternatively, the memory 418 stores the patch table 419, whereas the patch code, shown as patch code 420, is stored within the RAM 406. The patch table 419 includes one or more patch vectors, where each patch vector includes a break-out address and a patch-in address, as further described below. The memory 418 may be implemented as any type of programmable memory device, including non-volatile and volatile memory devices. A programmable non-volatile memory device is particularly advantageous for maintaining valid data during initialization of the processing unit 302 (e.g., boot-up, power-up, start-up, reset, etc.), so that the stored data remains valid and need not be re-loaded. Alternatively, the memory 418 is a programmable volatile memory, such as one or more registers or the like, which must be reloaded after initialization. Although the patch code may be stored in the memory 418, the RAM 406 is a particularly advantageous location to store the patch code since it is already available even though available space for program data storage is somewhat reduced.

The patch control logic 416 includes a comparator 422, which operates to compare each break-out address in the patch table 419 with each address asserted on the POC bus 412. A breakout condition occurs when a break-out address in the patch table 419 matches the current address on the POC bus 412. Each break-out address includes a corresponding patch-in address in the patch table 419 to a location within the patch code 420. In response to detection of a breakout condition, the patch control logic 416 re-directs operation of the UPC 402 from the current break-out address to the patch-in address in the patch code 420. During normal operation, the patch control logic 416 asserts the DS signal to select the data output signals from the system memory 403. When the patch control logic 416 detects a breakout condition, it asserts the DS signals to select the DIN2 signals from the patch control logic 416 to redirect operation and switch control of the UPC 402 from the system memory 403. During the breakout event, the patch control logic 416 provides a jump instruction (or long jump instruction) followed by the appropriate patch-in address, causing the UPC 402 to jump to the corresponding location within the patch code 420 indicated by the patch-in address. The UPC 402 performs the switch to the patch code 420 and the patch control logic 416 asserts the DS signals to select the DIN1 signals of the memory system 403.

The patch code 420 is not restricted and may call any function or perform any operation just as the original program code. The patch code segment being executed may include a return function, such as a jump instruction or the like, to return operation to the original code. The return address may be to the same (or very next) address location in the original program code, or to any other selected address as determined by the patch code programmer. It is appreciated that any portion up to all of the original code may be superceded by the patch code 420. In this manner, the breakout event may be effectively seamless to the UPC 402. The patch controller 410 controls operation of the UPC 402 to determine when and where to break out of the original program code operation from the ROM 404 and into the patch code 420 and when and where to return back into the original code.

It is noted that the above operation assumes that the program operation of the UPC 402 is generally unlimited and that it may execute instruction fetch cycles to the RAM 406 to retrieve instructions in the patch code 420. The operation of the UPC 402 may be limited in one or more respects, however, depending upon its type and configuration. In one embodiment, the UPC 402 is restricted to executing instruction cycles only from predetermined ROM space and may therefore not execute instruction fetch cycles to the RAM 406. In this case, the patch code 420 located in the RAM 406 is outside the allowed operating instruction space of the UPC 402. In this case, the patch code 420 is mapped into unused ROM space. As shown, for example, the ROM 404 consumes only a portion of the entire ROM space 424 shown by dashed lines. An arrow 426 represents a mapping function which maps the patch code 420 within the RAM 406 into corresponding patch code space 428 within the unused portion of the ROM space 424. As known by one of ordinary skill in the art, the mapping function may be performed by decode logic in which the conditions under which the RAM space can be accessed are defined by logic equations to do the mapping from RAM space to ROM space. In one embodiment, for example, the decode logic comprises Verilog code used to implement the processing unit 302 and the IC 102. As a result, control of the UPC 402 is effectively redirected to from the ROM 404 to the patch code 420 within the RAM 406 albeit mapped into the patch code space 428 within the unused ROM space 424.

In some configurations, the state of the memory subsystem must be saved prior to the patch redirection and restored upon return into the original code ROM space. As known by those of ordinary skill in the art, the state of the memory subsystem can be saved by pushing the contents of one or more memory state registers onto an internal stack of the UPC 402 prior to jumping to another location. Upon return, the memory state value pushed onto the stack is popped from the stack and restored into the appropriate memory state register(s) to restore the memory state. If this is required by the particular processor or configuration, then the patch control logic 416 pushes the contents of the appropriate memory state registers onto the internal stack of the UPC 402 during a breakout event and prior to jumping into the patch code. The patch code 420, operating alone or in cooperation with corresponding code within the ROM 404, as further described below, pops the stack and restores the memory state register(s) to restore the memory state to facilitate return of control to the ROM 404.

Figure 5:
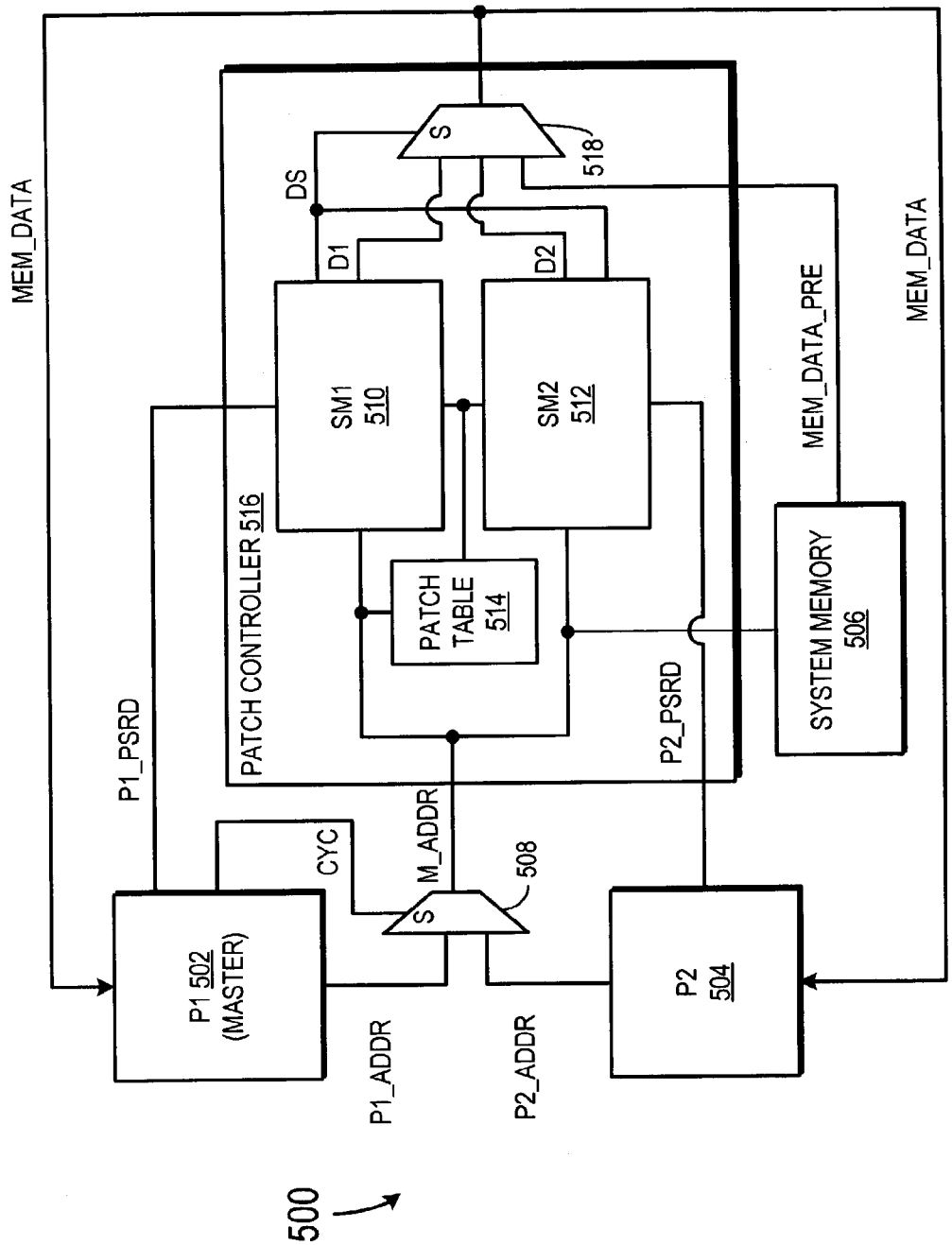
FIG. 5 is a simplified block diagram of another exemplary embodiment of the processing unit of FIG. 1 configured as a multiprocessor system.

FIG. 5 is a simplified block diagram of another exemplary embodiment of the processing unit 302 of the IC 102 configured as a multiprocessor system 500. Although certain details are not shown, such as, for example, the interface to the SOC bus 310, it is understood that the multiprocessor system 500 may be employed as the processing unit 302 of the IC 102. The multiprocessor system 500 includes a first processor (P1) 502 and a second processor (P2) 504 that share the same memory space shown as system memory 506. The system memory 506 includes ROM and RAM portions, as further described below, where the ROM portion stores the main program code for both processors 502 and 504 and where the RAM portion serves as processor data memory for both processors 502 and 504. As described herein, the RAM portion is also used to store patch code. The first processor 502 asserts addresses on address signal lines P1_ADDR and the second processor 504 asserts addresses on address signal lines P2_ADDR. The P1_ADDR and P2_ADDR signals are provided to respective data inputs of a MUX 508, which has an output providing multiplexed address signals M_ADDR to a patch controller 516 and to the system memory 506. The first processor 502 is considered the master and provides a select signal CYC to the select (S) input of the MUX 508 for determining which processor has control of the M_ADDR signals. In this manner, the relative memory access time is multiplexed based on the cycle state of the master processor 502. Within the patch controller 516, the M_ADDR signals are provided to a first state machine (SM1) 510 associated with the processor 502, to a second state machine (SM2) 512 associated with the processor 504, and to a patch table 514. The patch table 514 is similar to the patch table 418 previously described and includes one or more patch vectors, each including a break-out address and a corresponding patch-in address. The patch table 514 is coupled to both state machines 510 and 512 in such a manner that either state machine has complete access to all of the break-out address entries within the patch table 514.

The state machines 510 and 512 have data output signals D1 and D2, respectively, provided to respective inputs of a MUX 518 within the patch controller 516. A third input of the MUX 518 receives data signals MEM_DATA_PRE from the system memory 506, and the MUX 518 has a select control (S) input receiving data select (DS) signals provided from both of the state machines 510 and 512. As appreciated by those of ordinary skill in the art, the DS signals are controlled by either state machine 510, 512 and may be wired-OR configured or divided into separate control signals for controlling corresponding separate inputs. The output of the MUX 518 provides memory data input signals MEM_DATA to data inputs of both processors 502 and 504. The first processor 502 asserts a program space read signal P1_PSRD to state machine 510 when performing a memory read access and the second processor 504 asserts a separate program space read signal P2_PSRD to the state machine 512 when performing a memory read access. In this manner, the state machine 510 is active for controlling the MUX 518 when its processor 502 has control and is performing a read operation whereas the state machine 512 is active for controlling the MUX 518 when its processor 504 has control and is performing a read operation. In the configuration shown, the output data signals of the ROM and RAM portions of the system memory 506 are coupled to the same MEM_DATA_PRE signals, so that the state machines 510 and 512 only control the MEM_DATA signals during breakout events for transferring to patch code.

In a more specific configuration, both of the processors 502 and 504 are based on the 8051 processor architecture, such as based on the DesignWares® DW8051™ MacroCell Solution by Synopsis, Inc. In one embodiment, the IC 102, including the multiprocessor system 500 and the processors 502, 504 are defined using Verilog code or the like. Each instruction cycle lasts for 4 system clock cycles in which only the first 2 cycles of the 4 are permitted to be memory access cycles. The instruction and data memory accesses are multiplexed onto the same memory bus, so that each memory access is either an instruction or data fetch from one of the two processors 502 and 504. In the configuration illustrated, the processors 502 and 504 do not perform pre-fetch operations and there is no memory caching. The memory system of each processor is normally limited to 64 kilobytes (kbytes) using 16 address bits. By employing banking, however, the addressing range may be extended. In one particular embodiment, the addressing range is extended to 256 kbytes using four banks, although additional banks may be employed to extend the memory range further if desired.

In a normal system startup situation in which there is no patch function, the master processor 502 boots up first and configures the system. When the memory system 506 and processor peripherals have been properly configured and all housekeeping operations have been completed, the second processor 504 is released to run 180 degrees out of phase with the processor 502. For example, processor 502 asserts the CYC signal to control M_ADDR to provide an address and access the system memory 506 for two cycles and then negates the CYC signal while processor 504 controls M_ADDR for the next two cycles and so on. In the configuration shown, the patch table 514 is a volatile memory and patch code is loaded in a volatile portion of the system memory 506 (e.g., RAM). Thus, if patch information exists, it is downloaded from an external source during initialization (boot-up, start-up) of the multiprocessor system 500. In one embodiment, the existence of patch information is communicated to the processor 502 during the initialization process by an external device, such as the host logic 202 of the peripheral circuit 112. The processor 502 cooperates with the host logic 202 to transfer the patch information stored in an external memory, such as the memory 204, to the patch table 514 and the volatile portion of the system memory 506.

In an alternative embodiment, the boot portion and/or program portion of the system memory 506 includes at least one patch load instruction that causes the processor 502 to search for the presence of an external memory and to determine whether patch information is stored within the external memory. For example, the processor 502 detects the memory 108 and stored patch information therein and controls the patch information transfer process to load the patch table 514 and the system memory 506. Of course, the processor 502 may, in addition, or in the alternative, search for the existence of the memory 204 and any stored patch information therein, and download the patch information alone or in cooperation with the host logic 202.

Figure 6:
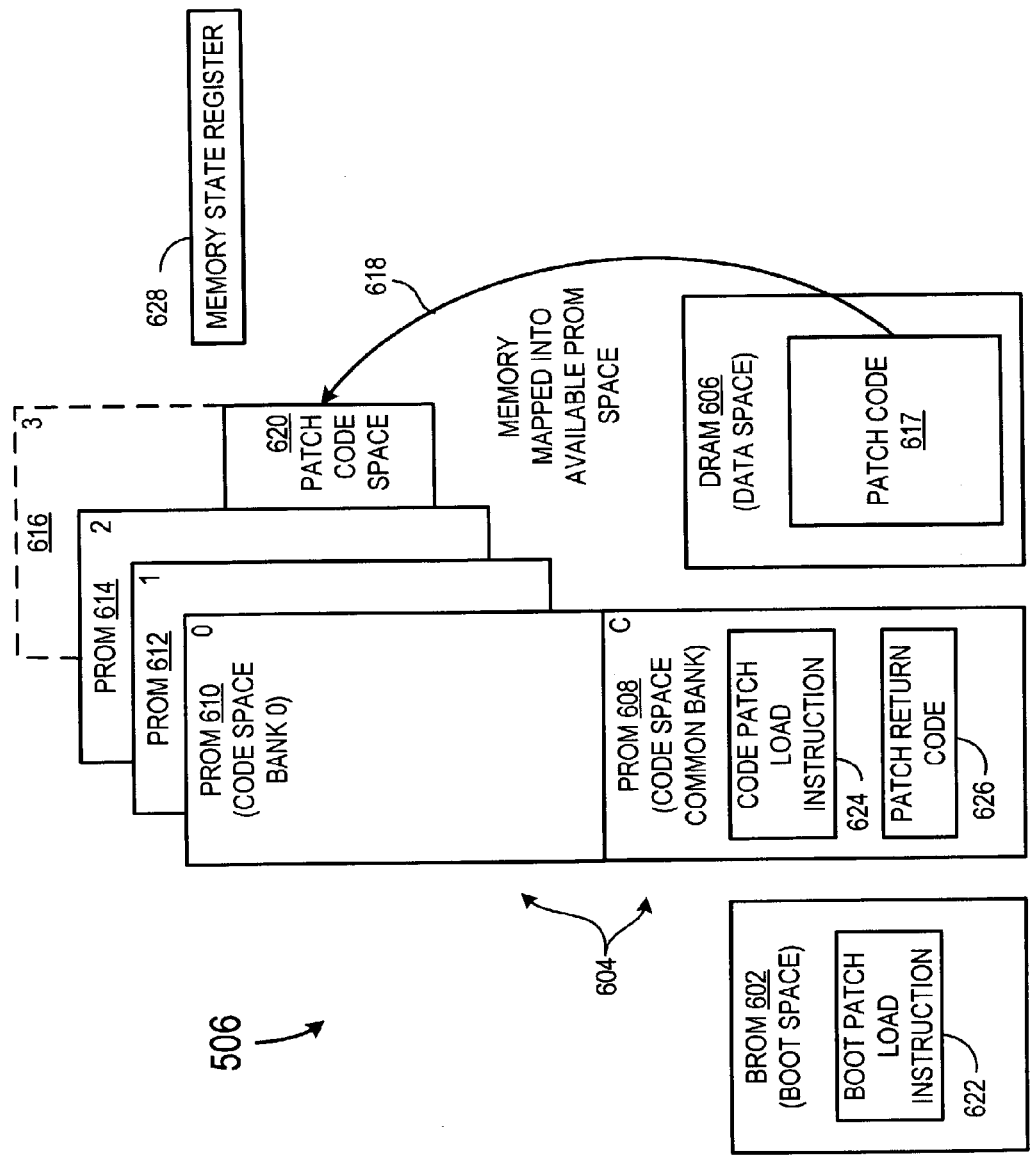
FIG. 6 is a more detailed block diagram of the system memory of FIG. 5 for the 8051 architecture configuration.

FIG. 6 is a more detailed block diagram of the system memory 506 for the 8051 architecture configuration. The 8051 architecture allows for a physically separate ROM bus for booting from a separate boot ROM (BROM) 602. The system memory 506 includes program ROM (PROM) 604 for storing original processor code. The system memory 506 includes a data RAM (DRAM) 606, which is normally provided for storing program data. In the 8051 architecture configuration, the BROM 602 is 16 kbytes, although any appropriate size is contemplated. The PROM 604 is subdivided into multiple banks including four used banks, in which the used banks include a common bank (C) 608 and three additional banks 610, 612 and 614 (labeled 0, 1 and 2). In the embodiment shown, each of the banks 608–614 consume 32 kbytes of code space for a total of 128 kbytes of code space. A fifth bank 616 is shown in dashed lines (and labeled 3) indicating that it is unused and that a physical ROM device is not present in this code space. The DRAM 606 is loaded with patch code 617, so that the DRAM 606 is effectively divided into program and data portions, where the data portion is the remaining space left over after loading the patch code 617. In the 8051 architecture configuration, the processors 502, 504 are not allowed to perform instruction fetch cycles within the data space of the DRAM 606. As indicated by an arrow 618, the patch code 617 is mapped, using decode logic or the like as previously described, into a patch code space 620 within the unused fifth bank 616 of the PROM 604. In this manner, the patch code 617 is accessed and executed in a similar manner as any other program code from the PROM 604, even though physically located within the data space of the DRAM 606.

Patches may be desired to be made in the boot code as well as in the program code. Thus, it is desired to retrieve and load the patch information as early as possible, such as in the boot sequence upon power-up or reset of the multiprocessor system 500. As noted above, in one embodiment, the multiprocessor system 500 determines the presence of an external memory and existence of patch information stored within the external memory. To facilitate this embodiment, one or more patch load instructions are provided within the stored code. The patch load instructions are not used for embodiments in which an external device, such as the host logic 202, controls the patch information loading process. As shown, the BROM 602 includes a boot patch load instruction 622 and the PROM 604 includes a code patch load instruction 624.

The boot patch load instruction 622 may be, although is not required to be, among the very first instructions executed by the processor 502 during the boot sequence. It is only necessary to load the patch information prior to execution of patch code. In one embodiment, the boot patch load instruction 622 loads all of the patch information, including any boot code patches and any program code patches. It is noted, however, that one function of the boot code is to reset or otherwise initialize portions of the multiprocessor system 500, including volatile memory, such as, for example, the DRAM 606 and/or the patch table 514. In this manner, any patch code 617 loaded within the DRAM 606 and any patch vectors loaded within the patch table 514 are lost when the volatile memory is reset. Thus, in an alternative embodiment, the separate code patch load instruction 624 is provided within the PROM 604, such as in the first bank 608, in addition or in the alternative. In this manner, separate patch information is loaded for the boot code and for the program code, and is loaded at separate times in the start-up process. The code patch instruction 624 may be, although is not required to be, among the very first program code instructions executed by the processor 502 in the start-up process after reset and after transitioning from the BROM 602 to the PROM 604. Again, it is only necessary to load the code patch information after reset and prior to execution of patch code.

Figure 7:
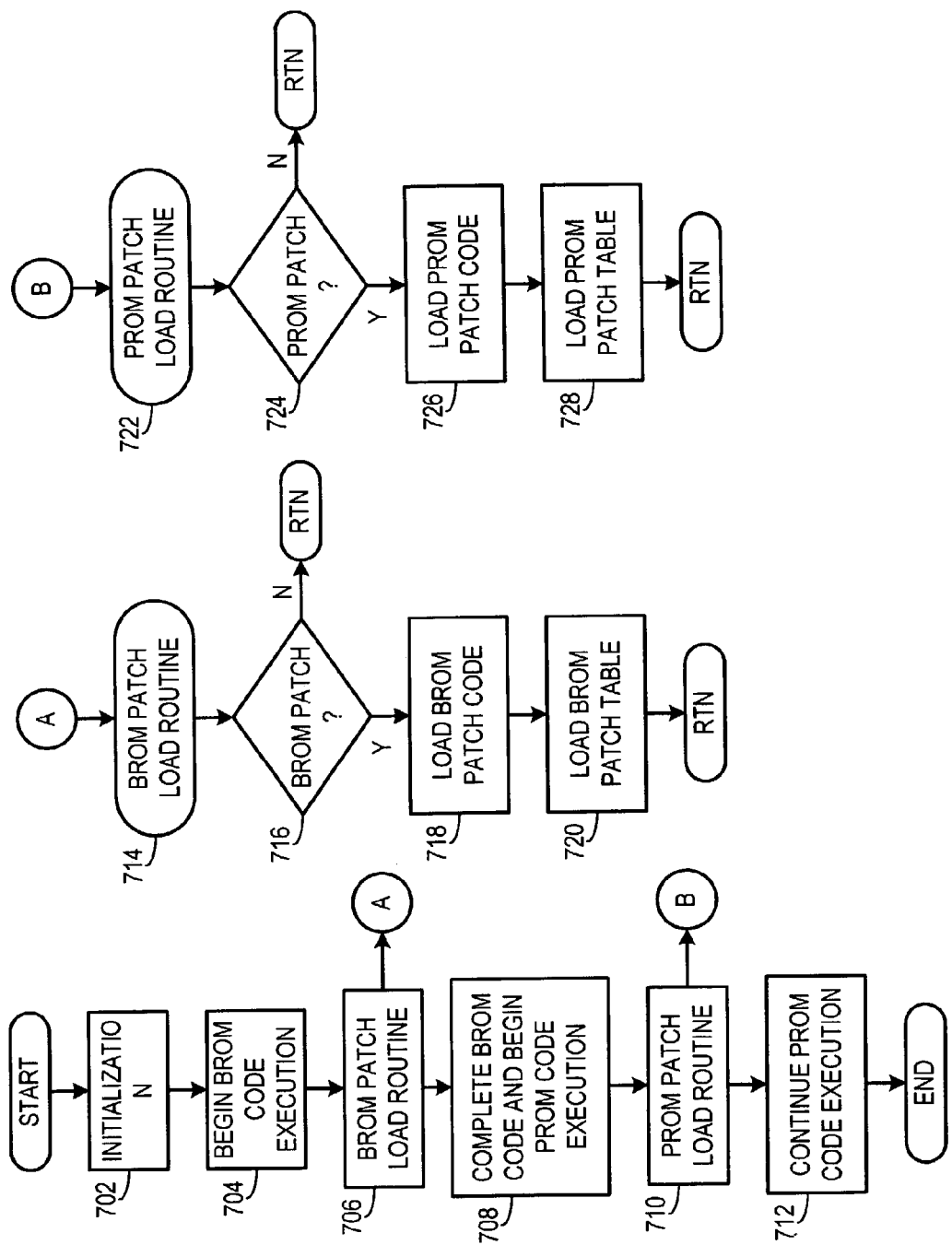
FIG. 7 is a flowchart diagram illustrating operation performed by the processor P1 during initialization of the multiprocessor system of FIG. 5 according to an exemplary embodiment for loading patch information.

FIG. 7 is a flowchart diagram illustrating operation performed by the processor 502 during initialization of the multiprocessor system 500 according to an exemplary embodiment for loading patch information. In this case, the boot patch load instruction 622 and the code patch load instruction 624 are both provided. The multiprocessor system 500 is initialized as shown at block 702 and the processor 502 begins executing boot code from the BROM 602 as shown at next block 704. At next block 706, the boot patch load instruction 622 is fetched and executed by the processor 502. The boot patch load instruction 622 includes one or more instructions for performing a patch load or to call a separate routine that performs the patch load for the BROM 602. As shown, operation jumps to a BROM patch load routine 714. At decision block 716, the processor determines the presence of the external memory, such as either of the memories 108 or 204, and whether any corresponding BROM patches are stored within. If so, operation continues to block 718 at which the corresponding BROM patch code is loaded into the data space of the DRAM 606, shown as the patch code 617. Operation proceeds to block 720, at which the patch table 514 is loaded with corresponding patch vectors, as further described below. If there is no external memory or patch code as determined at block 716, or after the patch information is loaded, operation returns to the main routine and continues.

Operation returns to block 708, representing execution of the remaining boot code in the BROM 602 and transfer to the PROM 604 to begin normal operation of the multiprocessor system 500. At next block 710, the code patch load instruction 624 is fetched and executed by the processor 502. The code patch load instruction 624 includes one or more instructions for performing a patch load or to call a separate PROM patch load routine 722 that performs the patch load for the PROM 604. Recall that the code patch load instruction 624 may be necessary if the boot code resets the volatile memory of the multiprocessor system 500 thereby erasing the previously loaded patch information. Operation proceeds to the PROM patch load routine 722, which is substantially the same as the BROM patch load routine 714, for determining the existence of an external memory device and patch code. In particular, the PROM patch load routine 722 includes additional blocks 724, 726 and 728 which are the same as blocks 716, 718 and 720, respectively, except particular to the PROM patch table and patch code. If additional patch code exists for patching the PROM 604, it is transferred and stored by the PROM patch load routine 722 in the same manner as the BROM patch load routine 714, and operation returns to continue execution of the program code in the PROM 604 as shown at block 712. The patch load operation is complete.

Figure 8:
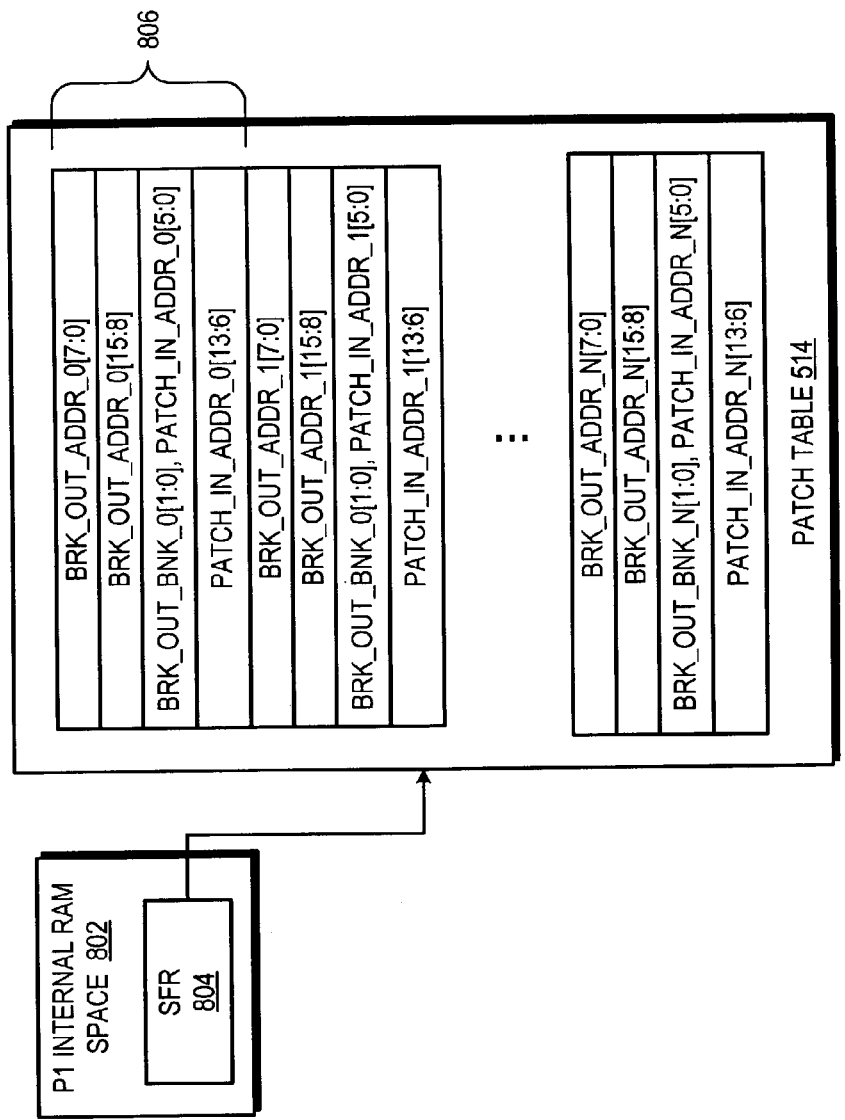
FIG. 8 is a block diagram illustrating an exemplary configuration of the patch memory of FIG. 5 and internal RAM space of the processor P1 used to load patch vectors into the patch memory according to one embodiment.

FIG. 8 is a block diagram illustrating an exemplary configuration of the patch memory 514 and internal RAM space 802 of the processor 502 used to load patch vectors into the patch memory 514 according to one embodiment. As described previously, in one embodiment, the patch table 514 is implementing with registers. The internal RAM space 802 of the processor 502 includes one or more special function registers (SFR) 804, which are employed as a doorway for the processor 502 to write patch vectors into the patch table 514. The patch table 514 is mapped indirectly into the SFR 804, which does not impact the program memory space of the processor 502. The patch table 514 is updated by first writing an address of the indirectly mapped patch table 514 to be updated to a first register of the SFR 804. The data that will be written to the array element of the patch table 514 is written to a second register of the SFR 804, and a write instruction is written to a third register of the SFR 804. Execution of the data written into these internal registers writes data into the patch table.

The data written into the patch table 514 includes one or more patch vectors, shown as patch vectors 0 to "N", where N is an integer. The total number of entries is chosen arbitrarily to meet system requirements and balance future flexibility with die area and cost. In one embodiment, the patch table 514 includes 16 patch vector entries including at least one entry reserved for the BROM 602, although it is understood that any appropriate number of vectors may be used. Each patch vector includes a break-out address and a corresponding patch-in address. In the embodiment shown for the 8051 configuration, each register of the patch table 514 is 8 bits whereas each PROM address is 16 bits. Thus, each patch vector, including a first patch vector 806, uses four registers. The first register stores the lower bits BRK_OUT_ADDR_0[7:0] and the second register stores the upper bits BRK_OUT_ADDR 0[15:8] of the first break-out address. The third register stores the 2-bit bank number BRK_OUT_BNK_0[1:0] of the first break-out address indicative of which of the banks 608–612 the breakout condition is to occur within the PROM 604. In this manner, each break-out address is stored within three 8-bit registers and uniquely identify any single program memory location within the BROM 602 or the PROM 604.

The remaining 6 bits of the third register stores the lower bits PATCH_IN_ADDR_0[5:0] of the first patch-in address and the fourth register stores the remaining 8 upper bits PATCH_IN_ADDR_0[13:6] of the first patch-in address of the first patch vector 806. It is noted that the patch-in address is only 14 bits sufficient to address up to 16 kbytes of patch code. The bank number is predetermined and fixed and references the unused bank 616 as previously described, so that the bank number is not needed for the patch-in address. Also, since each bank is 32 kbytes, and the location of the patch code space 620 is predetermined to be either the upper half or the lower half, only a total of 14 bits are necessary to access any instructions of the 16 kbyte patch code 617 mapped to the patch code space 620. This particular embodiment limits the patch code to a total of 16 kbytes. It is noted, however, that the particular 8051 configuration is exemplary only and that any suitable memory sizes and corresponding number of bits is contemplated.

Figure 9:
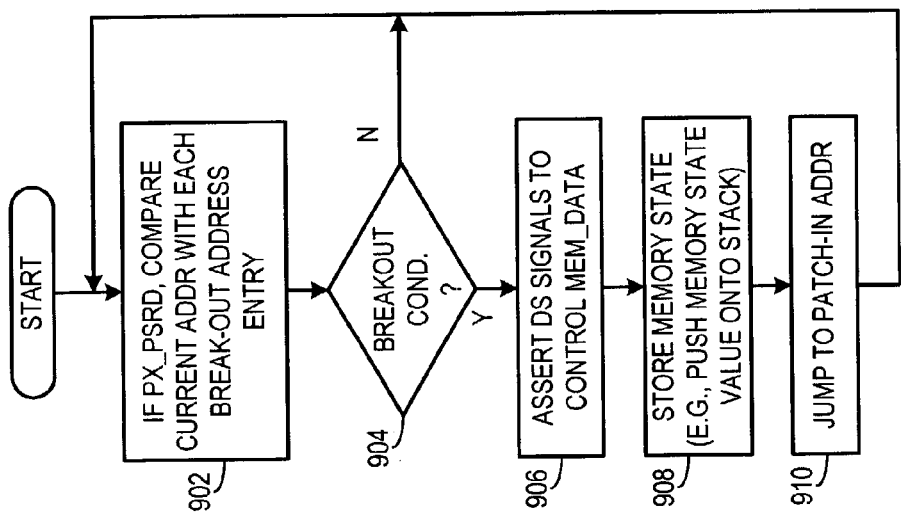
FIG. 9 is a flowchart diagram illustrating operation performed by both of the state machines of FIG. 5 to monitor for breakout conditions and to transfer operation to patch code.

FIG. 9 is a flowchart diagram illustrating operation performed by both of the state machines 510 and 512 to monitor for breakout conditions and to transfer operation to patch code. At a first block 902, the "indicated" state machine compares the current address asserted on the M_ADDR signals with each break-out address in the patch table 514. The state machine that is "indicated" is determined by the P1_PSRD and P2_PSRD signals (or PX_PSRD, where X is 1 or 2), where the state machine 510 is indicated when the P1_PSRD signal is asserted by the processor 502 and where the state machine 512 is indicated when the P2_PSRD signal is asserted by the processor 504. It is noted that the address compare is qualified by the P1_PSRD and P2_PSRD signals, which are indicative of read accesses rather than write accesses (and hence, reading from the BROM 602 or PROM 604 rather than reading from or writing to the DRAM 606).

If the current address does not equal any of the break-out address in the patch table 514 as determined at decision block 904, then operation returns to block 902 and operation loops until a breakout condition is detected. Otherwise, if a breakout condition is detected, that is, when the current address is equal to a break-out address as determined at block 904, the indicated state machine asserts the DS signals to take control of the MEM_DATA bus at next block 906. In particular, if the state machine 510 is indicated, it asserts the DS signals to select the D1 signals and if the state machine 512 is indicated, it asserts the DS signals to select the D2 signals. At block 908, the memory state of the system memory 506 is stored so that it may be later restored when returning control to the BROM 602 and/or the PROM 604. This operation is performed for those architectures, including the 8051 processor architecture, in which the memory state is restored to facilitate return of control to the ROM portion of the system memory 506. As shown in FIG. 6, a memory state register 628 is provided that tracks the state of the system memory 506. The memory state register 628 may be an internal register or internal RAM location of the processor 502. As appreciated by one of ordinary skill in the art, one way to save the memory state is to push the contents of the memory state register 628 onto an internal stack of the processor 502, so that the memory state value may be popped and restored back into the memory state register 628 to successfully restore the state of the system memory 506. At block 910, a jump instruction (or long jump instruction) and the corresponding patch-in address are provided to the active processor causing the active processor to jump to the appropriate location within the patch code 617. After the jump instruction and patch-in address are provided, operation of the indicated state machine is completed and returns to block 902. Meanwhile, the active processor begins executing the patch code as further described below.

The particular method performed at blocks 908 and 910 depend upon the particular processor configuration. For the 8051 architecture, the indicated state machine pushes (PUSHD) the contents of the memory state register 628 (e.g., internal RAM location 0x90) onto the stack (opcode 0xC0) and then issues a long jump (LJMP) instruction (0x02) to the address loaded into the patch location indicated by the patch-in address (PATCH_IN_ADDR_0[13:0]) associated with the break-out address that was hit. In this manner, a sequence of instructions and data is provided to the active processor to transfer operation into the patch code 617. It is noted that the bank number [1:0] and upper two address bits MEM_DATA[15:14] are filled in the by the indicated state machine so that the active processor jumps to the appropriate location in the patch code space 620.

Figure 10:
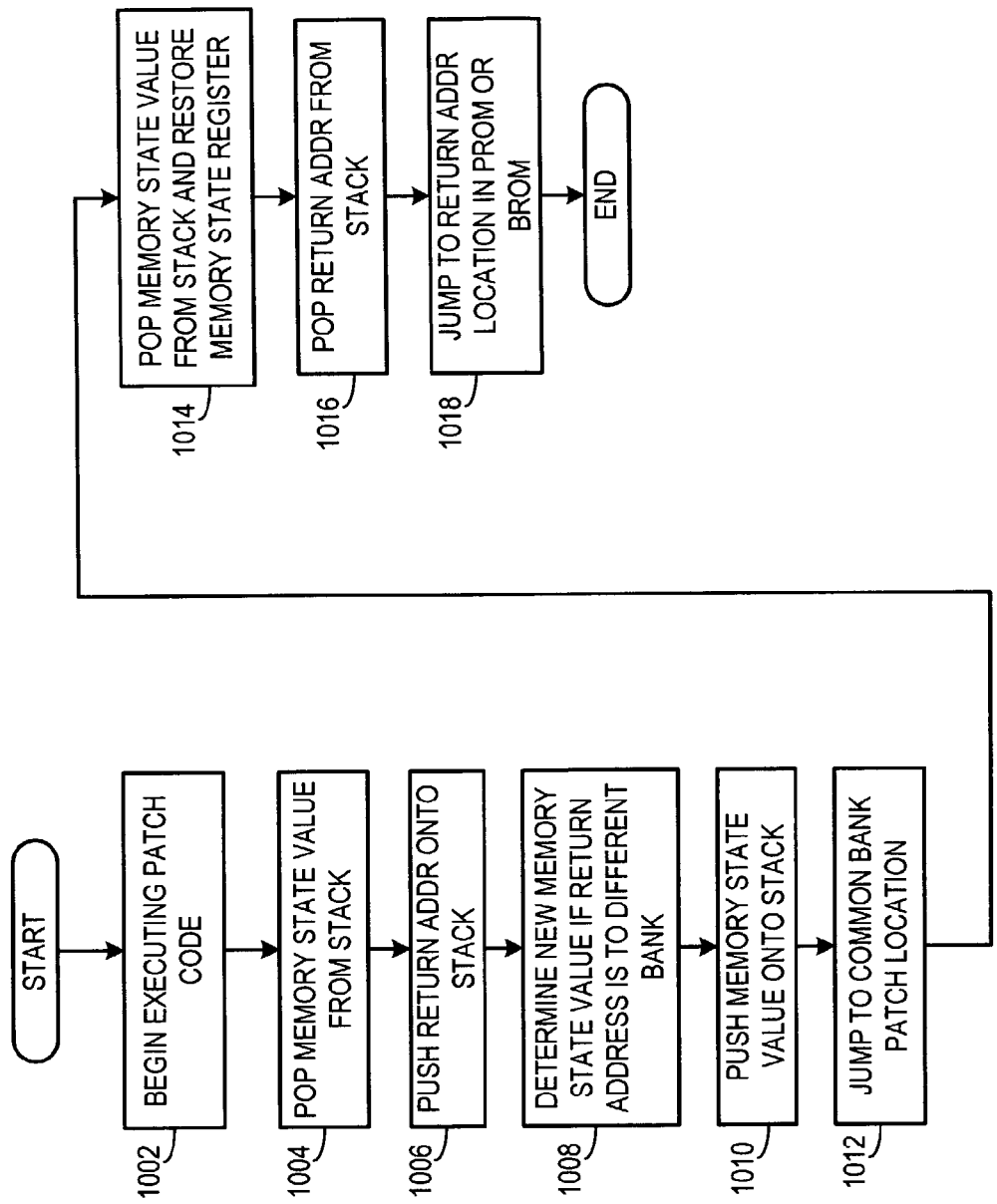
FIG. 10 is a flowchart diagram illustrating operation performed by either of the processors of FIG. 5 in response to a breakout condition and during a breakout event for those embodiments in which the memory state is to be restored.

FIG. 10 is a flowchart diagram illustrating operation performed by either of the processors 502 and 504 in response to a breakout condition and during a breakout event for those embodiments in which the memory state is to be restored. If the memory state need not be restored, the operation is significantly simplified in that the patch code 617 simply provides a return address to the desired location within the BROM 602 or the PROM 604. For this diagram, the processor 502 is described as the active processor, where it is understood that operation is essentially identical for either processor. After the corresponding state machine 510 transfers the processor 502 to the patch code 617, the processor 502 begins executing the patch code as shown at block 1002. The patch code 617 is not restricted any may call any function within any bank of code. Before control is returned to the BROM 602 or PROM 604, however, the memory state prior is restored. Each portion of patch code 617 includes instructions to restore the memory state. At block 1004, the patch code pops the stack to retrieve the memory state value stored on the stack. At block 1006, the return address is pushed onto the stack. At block 1008, the memory state value is modified or otherwise discarded in favor of a different memory state value if the return address is to a different bank other than the bank from which the breakout condition occurred. The different memory state value (modified or new) reflects the appropriate bank indicated by the return address provided in the patch code 617. Otherwise, if returning to the same bank, the original memory state value pushed onto the stack remains unchanged. At block 1010, that memory state value is pushed back onto the stack after the return address. At block 1012, a jump instruction is provided to jump to patch return code 626 provided within the common bank 608. In this case, the common bank 608 is visible within all banks of the system memory 506. The patch return code 626 includes instructions to pop the memory state value from the stack and to restore the memory state register 628 with the popped value at block 1014, to pop the return address from the stack at block 1016, and to jump to the return address location in the BROM 602 or PROM 604 indicated by the return address at block 1018.

Embodiments according to the present invention enable patches (e.g., fixes, functional enhancements, upgrades, changes, etc.) to be made to an embedded ROM-based processor or microprocessor from time to time. The present invention enables upgrades to be made to an electronic device incorporating an embedded ROM-based microprocessor system, enhancing its usefulness and increasing its lifespan.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. An embedded ROM-based processor system comprising:
   a processor;
   system memory, coupled to said processor, including a read-only memory (ROM);
   a programmable memory that stores patch information including patch code and one or more patch vectors, each patch vector comprising a break-out address from said ROM and a patch-in address to a corresponding location within said patch code;
   a data selector having an input coupled to said system memory and an output coupled to said processor; and
   a patch controller, coupled to said processor and said selector, operative to compare an address provided by said processor with each break-out address to determine a breakout condition, and to control said selector to transfer said processor to a corresponding location within said patch code in response to said break-out condition, and wherein:
   said patch controller provides a jump instruction and a corresponding patch-in address to said processor for said breakout condition; and
   said patch controller pushes a memory state value comprising contents of a memory state register onto a stack memory.

2. The embedded processor of claim 1, wherein said patch code includes instructions to pop said memory state value from said stack memory, to push a return address onto said stack memory, and to push said memory state value back onto said stack memory.

3. The embedded processor of claim 2, wherein said corresponding patch code pushes a different memory state value back onto said stack memory.

4. The embedded processor of claim 2, wherein said ROM includes a common bank that stores patch return code including instructions to pop said memory state value from said stack memory, to restore said memory state register, to pop said return address from said stack memory, and to jump to said return address of said ROM.

5. The embedded processor of claim 1, wherein said programmable memory comprises:
   a patch table comprising a plurality of registers coupled to said patch controller that stores each said patch vector; and
   said system memory comprising a random access memory (RAM) that stores said patch code.

6. The embedded processor of claim 5, further comprising:
   said system memory including unused ROM space; and
   decode logic that maps said patch code into said unused ROM space.

7. The embedded processor of claim 1, further comprising an external interface coupled to an external programmable non-volatile memory that stores said patch information.

8. The embedded processor of claim 7, wherein said ROM includes a patch load instruction that instructs said processor to access said external programmable non-volatile memory and to download said patch information to said programmable memory.

9. The embedded processor of claim 8, further comprising:
   said ROM comprising a boot ROM and a program ROM;
   said boot ROM including a first patch load instruction that instructs said processor to access said external programmable non-volatile memory and to download patch information to said programmable memory; and
   said program ROM including a second patch load instruction that instructs said processor to access said external programmable non-volatile memory and to download patch information to said programmable memory.

10. The embedded processor of claim 8, further comprising:
    external host logic, coupled to said external interface, that controls said processor during initialization and that downloads said patch information to said programmable memory from said external programmable non-volatile memory.

11. An embedded ROM-based processor system comprising:
    a processor, wherein said processor including at least one internal register; and
    said processor operative to map said patch table to said at least one internal register to load a patch vector,
    system memory, coupled to said processor, including a read-only memory (ROM);
    a programmable memory that stores patch information including patch code and one or more patch vectors, each patch vector comprising a break-out address from said ROM and a patch-in address to a corresponding location within said patch code, wherein said programmable memory comprises:
      a patch table comprising a plurality of registers coupled to said patch controller that stores each said patch vector; and
      said system memory comprising a random access memory (RAM) that stores said patch code
    a data selector having an input coupled to said system memory and an output coupled to said processor; and
    a patch controller, coupled to said processor and said selector, operative to compare an address provided by said processor with each break-out address to determine a breakout condition, and to control said selector to transfer said processor to a corresponding location within said patch code in response to said break-out condition, and wherein:
    said patch controller provides a jump instruction and a corresponding patch-in address to said processor for said breakout condition.

12. An integrated circuit (IC) comprising:
    a processor;
    a system memory, coupled to said processor, including a read-only memory (ROM) and a random-access memory (RAM) that stores patch code; and
    a patch controller, coupled to said processor and said system memory, comprising:
      a patch table that stores a plurality of break-out addresses and a corresponding plurality of patch-in addresses;
      a multiplexer having a control input for selecting between first and second data inputs, said first data input coupled to said system memory; and
      patch control logic, having a control output coupled to said multiplexer control input and a data output coupled to said second data input of said multiplexer, that compares an instruction fetch address provided by said processor with each break-out address in said patch table to detect a breakout condition, and that provides a corresponding patch-in address via said multiplexer to transfer control to said patch code for each breakout condition detected; further comprising:
      said system memory including unused ROM space; and
      decode logic that maps said patch code into said unused ROM space.

13. The IC of claim 12, further comprising:
    an input/output (I/O) bus, coupled to said processor, that enables external access; and
    said ROM including patch load instructions that instruct said processor to determine presence of patch information stored within an external memory via said I/O bus and to download patch information into said RAM and said patch table.

14. The IC of claim 12, further comprising:
    said patch control logic operative to save a memory state prior to transferring control to said patch code; and
    said ROM and said patch code including instructions to restore memory state and to return control to said ROM.

15. The IC of claim 14, wherein said patch control logic pushes a memory state value from a memory state register onto a stack memory, wherein said patch code pushes a return address onto said stack memory and transfers control to a patch return location in said ROM, and wherein said patch return location includes code to restore said memory state register and to jump to said return address.

16. The IC of claim 12, further comprising:
    said processor comprising first and second processors;
    an address selector for selecting between said first and second processors;
    said patch control logic including a first state machine coupled to said first processor and a second state machine coupled to said second processor; and
    said multiplexer having a first data input coupled to said system memory, a second data input coupled to said first state machine, and a third data input coupled to said second state machine.

17. The IC of claim 12, wherein said patch memory comprises a plurality of registers.

18. A method of providing a patch mechanism for a ROM-based embedded processor including a processor and a read-only memory (ROM), comprising:
    providing an internal programmable memory;
    receiving and storing patch information into the programmable memory, the patch information including patch code and one or more break-out addresses and corresponding one or more patch-in addresses;
    comparing a read cycle address with each break-out address to determine a breakout condition; and
    for each breakout condition determined, switching control from the ROM to the patch code at a corresponding patch-in address;

storing a memory state prior to said switching control; and
restoring the memory state prior to returning control back to the ROM.

19. The method of claim 18, wherein said providing a programmable memory comprises providing random-access memory (RAM) for storing the patch code.

20. The method of claim 18, wherein said providing a programmable memory comprises providing a plurality of registers that stores each break-out address and each corresponding patch-in address.

21. The method of claim 18, further comprising detecting patch information stored in an external memory device and downloading the patch information to the internal programmable memory.

22. The method of claim 18, wherein said switching control comprises providing a jump instruction and a corresponding patch-in address to the processor.

* * * * *